United States Patent
Lindoff et al.

(10) Patent No.: US 9,307,434 B2
(45) Date of Patent: Apr. 5, 2016

(54) METHODS AND DEVICES FOR REPORTING INTER-RADIO ACCESS TECHNOLOGY MEASUREMENTS

(75) Inventors: Bengt Lindoff, Bjärred (SE); Walter Müller, Upplands Väsby (SE); Mats Sågfors, Kyrkslätt (FI)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 247 days.

(21) Appl. No.: 13/985,171

(22) PCT Filed: Feb. 10, 2012

(86) PCT No.: PCT/EP2012/052308
§ 371 (c)(1),
(2), (4) Date: Aug. 13, 2013

(87) PCT Pub. No.: WO2012/110420
PCT Pub. Date: Aug. 23, 2012

(65) Prior Publication Data
US 2013/0324107 A1    Dec. 5, 2013

Related U.S. Application Data

(60) Provisional application No. 61/443,799, filed on Feb. 17, 2011.

(51) Int. Cl.
  *H04W 24/10* (2009.01)
  *H04W 88/06* (2009.01)
(52) U.S. Cl.
  CPC .............. *H04W 24/10* (2013.01); *H04W 88/06* (2013.01)
(58) Field of Classification Search
  CPC ............................ H04W 24/10; H04W 88/06
  USPC .............. 370/331, 328; 455/422.1, 424, 434, 455/435.2
  See application file for complete search history.

(56) References Cited

U.S. PATENT DOCUMENTS

| | | | |
|---|---|---|---|
| 2011/0188471 A1* | 8/2011 | Kim | 370/331 |
| 2011/0269453 A1* | 11/2011 | Ranta-Aho et al. | 455/424 |
| 2013/0070679 A1* | 3/2013 | Wegmann et al. | 370/328 |

FOREIGN PATENT DOCUMENTS

WO    0122759 A1    3/2011

OTHER PUBLICATIONS

Ericsson, et al., "Stage-3 details of Additional Reporting for CA", 3GPP TSG-RAN WG2 #71bis, Xi'an, China, Oct. 11, 2010, pp. 1-11, Tdoc R2-105532, 3rd Generation Partnership Project, XP002665672.

*Primary Examiner* — William Nealon
(74) *Attorney, Agent, or Firm* — Coats & Bennett, PLLC

(57) ABSTRACT

The invention relates to a method implemented in a user equipment 4 of a communication network 1 for reporting inter-radio access technologies measurements. The communication network 1 comprises a first radio access technology system 2 and a second radio access technology system 3. The user equipment 4 is connected to a primary serving cell of the first radio access technology system 2 and a secondary serving cell of the second radio access technology system 3. The method comprises: performing 110 signal strength measurements in the first radio access technology system 2; performing 120 signal strength measurements in the second radio access technology system 3; determining 130, 145, 230, 240, based on the signal strength measurements, whether a criterion for a measurement event relating to the second radio access technology system 3 is fulfilled, and transmitting 150, for a fulfilled criterion, a corresponding measurement report to the communication network 1. The invention also relates to a user equipment, network node and methods in a network node.

30 Claims, 7 Drawing Sheets

US 9,307,434 B2

METHODS AND DEVICES FOR REPORTING INTER-RADIO ACCESS TECHNOLOGY MEASUREMENTS

TECHNICAL FIELD

The technology disclosed herein relates generally to the field of wireless communication systems, and in particular to reporting of inter-radio access technology measurements within such wireless communication systems.

BACKGROUND

Today, there are many radio/wireless and cellular access technologies and standards such as GSM/GPRS (Global System for Mobile Communications/General Packet Radio Service), WCDMA/HSPA (Wideband Code Division Multiple Access/High Speed Packet Access), CDMA-based technologies, WiFi (wireless fidelity), WiMAX (Worldwide Interoperability for Microwave Access) and recently LTE (Long Term Evolution), to name a few. The technologies and standards have been developed during the last few decades, and it can be expected that the development will continue. Specifications are developed in organizations like 3GPP, 3GPP2 and IEEE.

Various frequency bands are typically allocated and/or sold by government organizations, such that an operator may "own" certain bands for a particular use (i.e. the right to use the band in a certain way). Regulations may specify that the owner, i.e. the operator, should deploy a particular technology in a particular frequency band. In some cases, the operator may be able to choose which technology and standard to deploy in their spectrum provided the choices fulfill certain criteria set up by e.g. the ITU (International Telecommunications Union).

As a consequence of the fact that spectrum is a scarce resource, an operator may have the rights to deploy a new cellular access, such as LTE, in a limited spectrum of, say 20 MHz.

However, the fact that the operator may have an existing customer base with existing mobile terminals/user equipment (UE) will prevent the operator from deploying only one technology in the whole spectrum owned by the operator. This could be the case e.g. for an operator that has a large customer base with WCDMA/HSPA subscriptions using the UTRAN network, and the operator wants to deploy the most recent evolution, the Long Term Evolution (LTE) of UTRAN, also called E-UTRAN.

In this example, the operator may then have to divide the available bands between HSPA and LTE. At initial deployment of LTE, the operator may thus continue to use e.g. 10 MHz (corresponding to two WCDMA carriers) with HSPA and reserve 10 MHz for initial LTE deployment.

However, such partitioning of the scarce spectrum to different technologies has some undesired effects on performance:

There is a direct correlation between the peak data rate (peak-rate) that can be offered and the spectrum width that is used. Thus, limiting the bandwidth of both HSPA and LTE to 10 MHz in the example above will roughly limit the peak-rate offered to customers to a half. Thus, for the sake of illustration, assuming that the technologies can offer around 100 Mbps in 20 MHz, it will mean that the peak-rate will be limited to around 50 Mbps in each of the technologies.

Initially, it may happen that the HSPA carriers are very loaded, while the LTE carriers in the example only have a few users. Thus, there would be an imbalance between allocation and use resulting in undesired congestion on the HSPA carriers. However, in order to offer a decent bit-rate on the LTE carriers, it is still not possible to allocate e.g. only 5 MHz to LTE customers, since then the LTE evolution would not provide competitive performance in relation to HSPA.

SUMMARY

3GPP is responsible for the development and maintenance of GSM/GPRS, WCDMA/HSPA and LTE standards. In the following description the example of the HSPA-evolution built on the WCDMA radio access also called UTRAN (UMTS Terrestrial Radio Access Network), and LTE is used as an illustrative environment. LTE is based on OFDM (Orthogonal frequency-division multiplexing) and SC-FDMA (Single-Carrier Frequency Division Multiple Access), also recognized as the Long Term Evolution of UTRAN, or E-UTRAN. Detailed UTRAN radio access specifications are described in the 25-series of 3GPP specifications, while E-UTRAN specifications are found in the 36-series. LTE was introduced in 3GPP Release 8, but the development and future evolution of both HSPA and LTE continues in parallel in Release 9, 10 and so on. It is noted that the invention is not restricted to any particular radio access technologies, the given examples being given to illustrate the invention.

Carrier aggregation, wherein a combination or aggregation of two independent carriers is made, is one way of achieving increased resource utilization and spectrum efficiently. For example, in LTE+HSPA carrier aggregation each carrier is an LTE carrier or a HSPA carrier. For such LTE+HSPA carrier aggregation one possibility is that a mobile terminal/user equipment (UE) is in connection to a primary serving cell on a primary/first RAT (for instance HSPA) on a first carrier and a secondary/second serving cell on a second RAT (for instance LTE) on a second carrier, i.e. in a similar way as primary and secondary cells are defined on intra RAT (LTE or HS) carrier aggregation. It is possible that one of the RATS and systems is considered as being the one in control of the UE, while the carrier or carriers on the other system (or RAT) is considered as a performance "booster", in the sense that such "secondary" carriers are added to enhance the performance. For example, UTRAN could be the primary system/RAT, while eUTRAN may be the secondary system/RAT. In a possible configuration situation, it could happen e.g. that a UE is first connected to UTRAN, and then later, the UE is configured to add carriers on LTE. LTE is then a secondary RAT, i.e. the connection control remains in UTRAN, even if some LTE carriers or cells are added to "boost" the performance. Of course, it is possible to envision the configuration such that LTE acts as the primary system, and UTRAN/HSPA is the secondary system.

Various possible future scenarios apply, and should not be seen as limiting the applicability of the present invention. In FIG. 1 a communication system 1 is illustrated, comprising a first RAT 2 and a second RAT 3, both RATs serving a user equipment (UE) 4. One of the RATs, in the illustrated example the first RAT 2, is connected to a core network 5, which handles various services, such as gateway services, mobility and switching. In FIG. 1, for the sake of illustration, one possible solution is outlined where HSPA is acting as the primary system and RAT 2 and LTE is the secondary system and RAT 3. In such a situation, it is possible that e.g. mobility is controlled by the primary system and RAT, as further described below.

One important aspect of cellular systems is mobility and handover (HO). Typically, handovers in cellular systems are network controlled, where the network is assisted by measurements provided by the UE. Various measurement events (or triggers) can be configured by the network, such that the UE reports e.g. when the radio conditions change in a particular way. Thereby, it should be possible for the network to make sound decisions on whether a handover of a UE is needed. For example, and in order for a mobile terminal/UE to inform the network about new strong cells that can be used as a potential new serving cell, different measurement events are defined both in LTE and WCDMA/HSPA.

It should be noted that such measurements can also be used for other purposes besides mobility issues, such as carrier or cell addition for multi-carrier aggregation, or e.g. for interference management between cells.

It is should also be noted that various systems use different nomenclature for "aggregation": In HSPA, the words dual- or multi-cell aggregation are often used, while LTE uses carrier-aggregation to denote the corresponding case (refer e.g. to "4G LTE/LTE-Advanced for mobile broadband, by E. Dahlman and Stefan Parkvall). Different nomenclature should not be regarded as limiting the scope of the present disclosure.

Different kinds of measurement events are defined for respective RAT, e.g. WCDMA/HSPA and LTE. WCDMA/HSPA furthermore support soft handover in which the mobile terminal/UE could be connected (i.e. configured to send and/or receive) to several cells (i.e. an Active Set, AS). HSPA further defines the HS-DSCH (High-Speed Downlink Shared Channel) serving cell and E-DCH (Enhanced Dedicated Channel) serving cell among the cells in the active set. For further information on this refer to 3GPP Technical Specification TS25.331, and e.g. 3GPP TS25.319, and TS25.308.

Specification TS25.331 includes multiple examples of prior art measurement events. Some events that can be used for intra-frequency handovers (HO:s) comprise, for WCDMA: 1A (add cell to AS), 1B (remove cell from AS), 1C (replace a cell in AS), 1D (change of best cell in AS). For example, 1A is defined as "A primary CPICH (Common Pilot Channel) enters reporting range", meaning that a new cell may be considered for inclusion in the active set. Still, it is the network that decides whether the reported cell is included or not.

Corresponding intra-frequency measurement events for LTE are called: A1, A2 (Serving cell signal strength better/stronger/higher or worse/lower than absolute threshold), A3 (Neighbor cell signal strength becomes offset better than Serving cell), A4 (neighbor cell signal strength stronger than threshold) and A5 (serving cell signal strength below first threshold and neighbor cell signal strength above second threshold).

3GPP Technical Specification TS36.331 includes multiple events to support HO, carrier addition and removal, etc. These events include A1 and A2 (signal strength of serving cell becomes better/stronger/higher or worse/lower than absolute threshold), A3 for comparison of a neighbor cell with the serving cell, and e.g. events B1 and B2 for inter-RAT measurement evaluations. Furthermore, in multi-carrier LTE a new measurement event have been defined, A6 (intra-frequency neighbor becomes offset better than Serving Cell, on secondary carrier). By this event, it is possible to evaluate the relative strength of cells on a carrier, where this carrier does not have the primary serving cell, or PCell. By this event, the network may make a cell change on the secondary LTE carrier.

As noted, there are also events related to inter-RAT handover (IRAT HO), in order to find other potential RATs to do a hard HO to in case the serving cell as well as (the strongest) neighboring intra frequency cells on the current RATs becomes weak (i.e. terminal/UE goes out of coverage). In WCDMA, the most important are 3A (serving cell CPICH signal strength lower than first threshold and RXLev on GSM carrier signal strength becomes stronger than second threshold) and 3D (change of best neighbor GSM carrier). For LTE the following events are defined: B1 (neighbor cell signal strength on other RAT becomes stronger than a threshold), and B2 (serving cell become worse/lower than a first threshold, and neighbor cell signal strength on other RAT becomes stronger than second threshold).

The simultaneous use of different radio access technologies introduces several challenges. The inventors of the present invention foresee a need for a network node to make connection management decisions based on more information than the current inter-RAT measurements are designed for and able to provide. In particular, there is currently no solution for supporting connection handling on the secondary RAT in an efficient way.

Thus, there is a need to overcome the aforementioned problems, to which the present disclosure provides solutions through the embodiments described herein. The discussion will provide solutions for simultaneous use of multiple radio access technologies ("inter-RAT"), for example as LTE+HSPA carrier aggregation, such that higher peak rates and load balancing can be offered in heterogeneous deployments including at least two radio-access technologies. Both LTE carrier aggregation as well as HSPA carrier aggregation, i.e. carrier aggregation within the same radio access technology ("intra-RAT"), is defined in the Release 10 standard of the 3GPP specification.

An object of the invention is to overcome or at least alleviate the above mentioned problems.

The object is, according to a first aspect of the invention, achieved by a method implemented in a wireless device or user equipment of a communication network for reporting inter-radio access technologies measurements. The communication network comprises a first radio access technology system and a second radio access technology system, and the user equipment is connected to a primary serving cell of the first radio access technology system and a secondary serving cell of the second radio access technology system. The method comprises: performing signal strength measurements in the first radio access technology system; performing signal strength measurements in the second radio access technology system; determining, based on the signal strength measurements, whether a criterion for a measurement event relating to the second radio access technology system is fulfilled; and transmitting, for a fulfilled criterion, a corresponding measurement report to the communication network.

Embodiments of the invention enable the monitoring a need for change of a serving cell within a second serving radio access technology network, besides the monitoring a need for change of serving cell within a first serving radio access technology network. This is enabled by providing inter radio access technology network monitoring events.

In an embodiment, the transmitting comprises transmitting a measurement related to the second radio access technology system to the first radio access technology system.

In an embodiment, the determining whether a criterion for a measurement event relating to the second radio access technology is fulfilled comprises determining whether a neighbor cell on the second radio access technology system becomes a configurable parameter stronger than the secondary serving cell on the second radio access technology system.

In a variation of the above embodiment, the performing of signal strength measurements in the second radio access technology system comprises: measuring a neighbor-cell signal strength measurement on a carrier in the second radio access technology system; measuring a serving-cell signal strength measurement on a carrier in the second radio access technology system, and wherein the determining whether a criterion for a measurement event relating to the second radio access technology is fulfilled, comprises comparing the neighbor-cell signal strength measurement with the secondary serving-cell signal strength measurement.

In an embodiment, the method comprises determining whether a criterion for a measurement event related to the first radio access technology system is fulfilled.

In a variation of the above embodiment, the method comprises determining whether signal strength of the secondary serving cell on the second radio access technology system is above a first threshold and the signal strength of the primary serving cell on the first radio access technology system is below a second threshold.

In another variation, the method comprises determining if the secondary serving cell on the second radio access technology system is a configurable parameter stronger than the primary serving cell in the first radio access technology system.

In an embodiment, the determining whether a criterion for a measurement event relating to the second radio access technology is fulfilled comprises determining whether the signal strength of the strongest cell on the second radio access technology system becomes lower than a threshold.

In an embodiment, the determining whether a criterion for a measurement event relating to the second radio access technology is fulfilled comprises determining whether a neighbor cell on the second radio access technology system should be added to active set of the second radio access technology system, and/or determining whether a neighboring cell should replace the secondary serving cell on the second radio access technology system, and/or determining whether the secondary serving cell on the second radio access technology system should be removed from an active set of the second radio access technology system.

In an embodiment, the measurement event relates to a serving cell change.

Further, the object is, according to a second aspect of the invention, achieved by a wireless device or a user equipment of a communication network comprising a first radio access technology system and a second radio access technology system. The user equipment is configured to be connected to a primary serving cell of the first radio access technology system and a secondary serving cell of the second radio access technology system. The user equipment comprises a processor circuit configured to: perform signal strength measurements in the first radio access technology system; perform signal strength measurements in the second radio access technology system; determine, based on the signal strength measurements, whether a criterion for a measurement event relating to a serving cell change on the second radio access technology system is fulfilled; and transmit, for a fulfilled criterion, a corresponding measurement report to the communication network.

In an embodiment, the processor circuit is configured to determine whether a neighbor cell on the second radio access technology system becomes a configurable parameter stronger than the secondary serving cell on the second radio access technology system.

In a variation of the above embodiment, the processor circuit is configured to perform signal strength measurements in the second radio access technology system by: measuring a neighbor-cell signal strength measurement on a carrier in the second radio access technology system; measuring a serving-cell signal strength measurement on a carrier in the second radio access technology system; and wherein the determining of fulfillment of a measurement event, comprises: comparing the neighbor-cell signal strength measurement with the secondary serving-cell signal strength measurement.

In an embodiment, the processor circuit is further configured to determine whether a criterion for a measurement event related to the first radio access technology system is fulfilled.

In a variation of the above embodiment, the processor circuit is configured to determine whether the signal strength of the secondary serving cell on the second radio access technology system is above a first threshold and the signal strength of the primary serving cell on the first radio access technology system is below a second threshold.

In another variation, the processor circuit is configured to determine if the secondary serving cell on the second radio access technology system is a configurable parameter stronger than the primary serving cell in the first radio access technology system.

In an embodiment, the processor circuit is configured to determine whether the signal strength of the strongest cell on the second radio access technology system becomes worse/lower than a threshold.

In an embodiment, the processor circuit is configured to determine whether a neighbor cell on the second radio access technology system should be added to active set of the second radio access technology system, and/or determining whether a neighboring cell should replace the secondary serving cell on the second radio access technology system, and/or determining whether secondary serving cell on second radio access technology system should be removed from an active set of the second radio access technology system.

In an embodiment, the measurement event relates to a serving cell change.

Still further, the object is, according to a third aspect of the invention, achieved by a method implemented in a network node of a communication network comprising a first radio access technology system and a second radio access technology system, the communication network further comprising a user equipment. The method comprises: setting up a connection to the user equipment to a primary serving cell of the first radio access technology system and a secondary serving cell of the second radio access technology system, and configuring the user equipment with one or more measurement events relating to the second radio access technology system.

In an embodiment, the method comprises monitoring and receiving a measurement report from the user equipment corresponding to a criterion for the measurement event being fulfilled, and performing an action in accordance with the received measurement report.

In a variation of the above embodiment, the measurement report is related to the second radio access technology system and received via the first radio access technology system.

In an embodiment, the configuring comprises configuring the user equipment with a criterion and measurement event for determining whether a neighbor cell on the second radio access technology system becomes a configurable parameter stronger than the secondary serving cell on the second radio access technology system.

In an embodiment, the configuring comprises configuring the user equipment to determine whether a criterion for the measurement event related to the first radio access technology system is fulfilled.

In a variation of the above embodiment, the configuring comprises configuring the user equipment with a criterion and measurement event for determining whether the signal strength of the secondary serving cell on the second radio access technology system is above a first threshold and the signal strength of the primary serving cell on the first radio access technology system is below a second threshold.

In another variation, the configuring comprises configuring the user equipment with a criterion and measurement event for determining if the secondary serving cell on the second radio access technology system is a configurable parameter stronger than the primary serving cell in the first radio access technology system.

In an embodiment, a criterion for the measurement event comprises determining whether the signal strength of the strongest cell on the second radio access technology system becomes worse than a threshold.

In an embodiment, the configuring comprises configuring the user equipment with a criterion and measurement event for determining whether a neighbor cell on the second radio access technology system should be added to active set of the second radio access technology system, and/or for determining whether a neighboring cell should replace the secondary serving cell on the second radio access technology system, and/or for determining whether secondary serving cell on second radio access technology system should be removed from an active set of the second radio access technology system.

In an embodiment, the measurement event relates to a serving cell change.

The object is, according to a fourth aspect of the invention, achieved by a network node of a communication network comprising a first radio access technology system and a second radio access technology system. The communication network further comprises a user equipment being connected to a primary serving cell of the first radio access technology system and a secondary serving cell of the second radio access technology system, network node comprising a processor circuit configured to: set up a connection to the user equipment to a primary serving cell of the first radio access technology system and a secondary serving cell of the second radio access technology system, and configure the user equipment with one or more measurement events relating to the second radio access technology system.

In an embodiment, the processor circuit is further configured to: monitor and receive a measurement report from the user equipment corresponding to a criterion for the measurement event being fulfilled, and perform an action in accordance with the received measurement report.

In various further embodiments, the processor circuit is arranged to perform features of the method implemented in a network node as described earlier.

Further features and advantages of the invention will become clear upon reading the following description and the accompanying drawings.

DETAILED DESCRIPTION OF EMBODIMENTS

Figure 1:
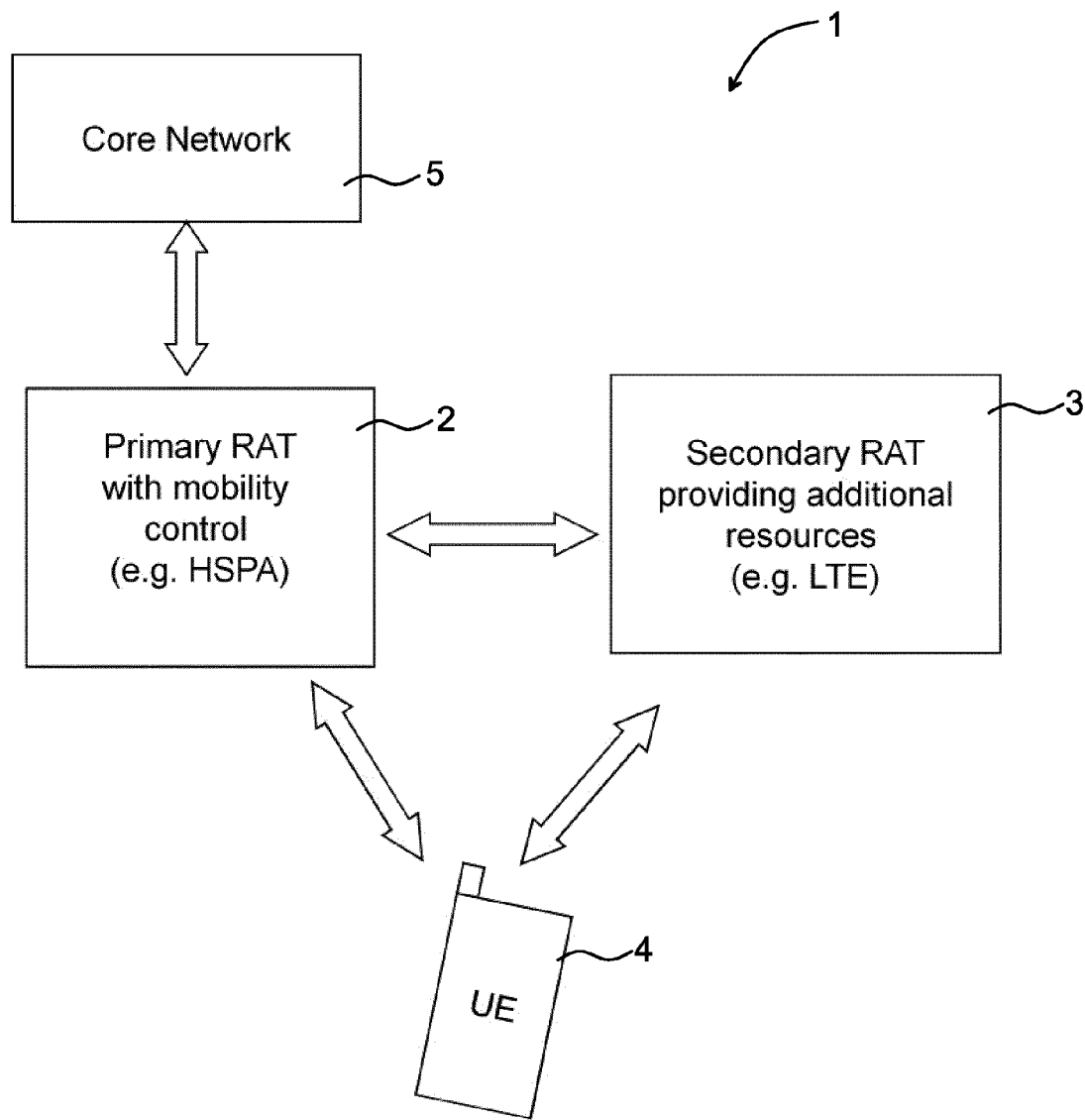
FIG. 1 exemplifies aggregation with a primary system and secondary system.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In the following, the shortcomings of prior art are described some more in relation to various aspects of the invention, in order to provide thorough understanding of aspects of the present invention.

Among prior art measurement events, there is no event that would be designed for the scenario described herein, with inter-RAT carrier aggregation (simultaneous use of different RATs). Namely, there is currently no solution to support connection handling on the secondary RAT in an efficient way. This connection handling may e.g. comprise secondary serving cell changes, interference management or carrier/cell addition/removal of a UE, where the UE is simultaneously supporting a connection over multiple RATS. In particular, the scenario where a UE is using at least one carrier/cell over WCDMA/HSPA, and at least a second carrier/cell over LTE is considered. A deficiency of current inter-RAT measurements is, that they are intended for scenarios where the UE may have to leave the first RAT in favor of the second (i.e. hard handover). However, in inter-RAT carrier aggregation, there will be a need to manage the secondary cells in the secondary RAT, without necessarily making a (hard) handover. Therefore, the network node making the connection management decisions will need additional information, as provided by the present invention.

Assuming for a moment that there is one receiving node in the network that is the receiver of the measurements, and that this entity is the entity that makes decisions related to handover, cell addition/removal in active set, serving cell change etc. For illustration purpose only, assume that this entity is a Radio Network Controller (RNC) node in the UTRAN. Logically, UTRAN may then be considered to act as a primary system.

Now, the existing UTRAN events (as defined in TS25.331 and some of which has been described briefly earlier) give a good possibility for monitoring the situation on the carriers traditionally controlled by the UTRAN (primary system) leading e.g. to handovers within UTRAN. However, the existing events do not give any good understanding of the situation in the second system (here assumed to be LTE). The inter-RAT measurements of existing art is intended for triggering a handover to the neighboring system, and these inter-RAT events do not give any appropriate measurements for managing a connection in the second system/RAT (LTE). In particular, it should be understood that there may be a multitude of mobile equipment in the second system/RAT (LTE) that is not within control of the first system/RAT, i.e. there are many LTE UEs that are not visible to the RNC, and therefore only appear as "interferers" in the second system/RAT. Thus, the RNC in the example above will have difficulties in making good connection handling decisions for the carriers in the second RAT (LTE). There is therefore a need for new Inter-RAT events, as provided in this disclosure.

To further exemplify, there may be a need to change the serving cell in the second system, for which there is no such inter-RAT event. For example, there may be a need for the controlling entity in the first system to understand the relative strength/goodness of cells in the second system, and to understand the change of relative strength/goodness of a received pilot among cells in the secondary system.

Even though several measurement events are defined in HSPA and LTE, none of them are useful for the network to get knowledge of need to change of serving cell or update of active set on the second serving RAT as well as change of primary and secondary serving RAT.

The present disclosure provides a solution to the above mentioned problems. New measurement events for triggering change of serving cell (or update of AS) on secondary RAT as well as triggers for change of primary RAT are defined.

In particular, and according to one embodiment, new Inter RAT measurement events are described where a UE is configured to report measurements related to a secondary RAT via a primary RAT. That is, a measurement report about measurements made in the secondary RAT is sent to the core network 5 via the primary RAT.

In particular, a new event criterion includes a comparison of neighbor-cell quality on a secondary RAT carrier with the quality of a serving cell on a secondary RAT carrier. The neighbor-cells may be on the same carrier as the serving cell, or on another secondary RAT carrier.

In another embodiment, the quality of a serving cell on a secondary RAT carrier is compared with the quality of a serving cell on a primary RAT carrier. With this event, it is possible to decide if the primary RAT should be changed to the other RAT.

In yet another embodiment a measurement event related to determination of whether the signal strength of the best cell (or the serving cell) on a secondary RAT carrier becomes worse/lower than a threshold. Such event can be used by the network to control the removal or deactivation of the secondary RAT.

Furthermore, method and apparatus for implementation of the new functionality in wireless communication devices, mobile terminals or UEs as well as network nodes are described.

Figure 2:
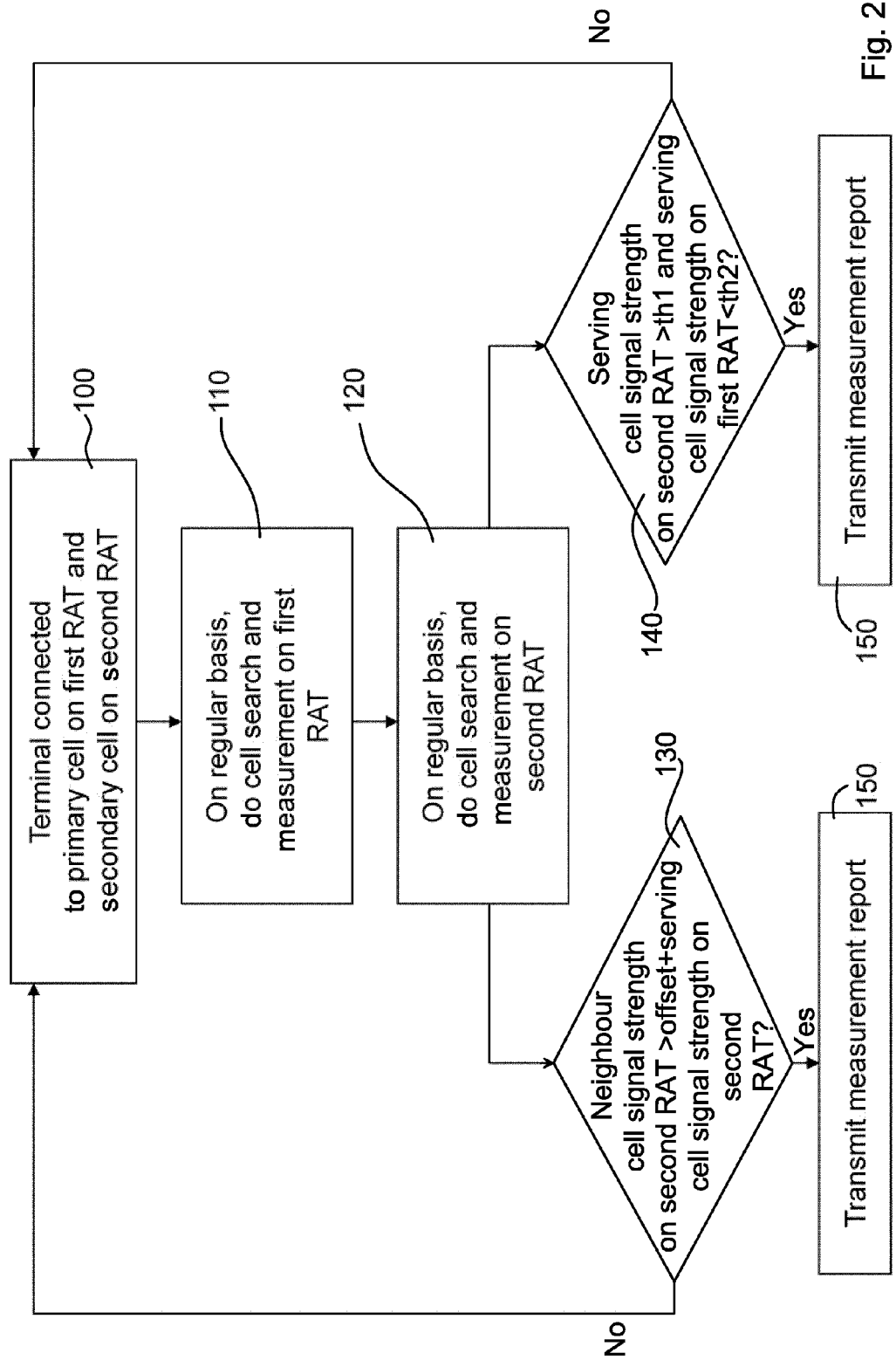
FIG. 2 is a flow chart of methods implemented in a user equipment.

FIG. 2 shows a flow chart of a first embodiment, implemented in a mobile terminal, wireless device or UE. The UE, capable of LTE+HSPA carrier aggregation is connected 100 to a primary cell on a first RAT and a secondary cell on a second RAT. These cells are also denoted primary and secondary serving cells, respectively.

The information about which RAT that is primary and secondary may be determined by the network node. The network node typically signals this information to the UE. Alternatively, it could happen that only one of the RATS may, i.e. is able to, act as primary RAT, in which case no signaling is needed and no explicit determination is needed.

On regular basis the terminal/UE does intra-frequency cell search (to find new neighboring cells) and signal strength measurements on detected neighboring as well as serving cell(s) on the first (primary) RAT, according to known principles and procedures defined for the particular RAT (110). According to the present embodiment, this is made also on the secondary RAT (120). The terminal/UE then determines whether measurement events related to the primary RAT are triggered (not shown), i.e. whether a respective criterion for the one or more measurement events is fulfilled.

According to the present disclosure, the UE now also determines whether the new measurement event related to a serving cell change on the second RAT has been triggered, i.e. whether the signal strength of a neighbor cell on the Second RAT becomes an "offset" (a configurable parameter) stronger than the signal strength of the (secondary) serving cell on the Second RAT (130). The network node, can based on such information decide whether there should be a serving cell change on the secondary RAT. The offset here is a parameter set by the network and may typically lie within the range of [0, 6] dB, although also larger offsets may be applied.

In another embodiment, the UE also performs measurements to support change of primary RAT. For example, the UE may be arranged to determine whether the signal strength of a Secondary serving cell on the second RAT is above a first threshold, while the signal strength of Primary serving cell on first RAT goes below a second threshold (140). When this criterion for a measurement event is fulfilled, the UE submits a corresponding measurement to the network (150). The network may then take the appropriate actions e.g. to change primary RAT. Furthermore, in an alternative embodiment, the measurement event is a relative measurement event, and the evaluation may comprise evaluating the fulfillment of a criterion for the relative measurement event. Fulfillment of a criterion may be determined e.g. if the signal strength of a Secondary (serving) cell on second RAT is becoming "offset" stronger than the signal strength of the primary (serving) cell on first RAT (130). Again "offset" is a network (NW) specific parameter in the sense that it would be configured by the network. Once the measurement event is triggered, i.e. the criterion is fulfilled, a measurement report is transmitted to the network node (150). The measurement report may include information of that it was this particular event that triggered the report, in case the UE is configured with multiple events.

Figure 3:
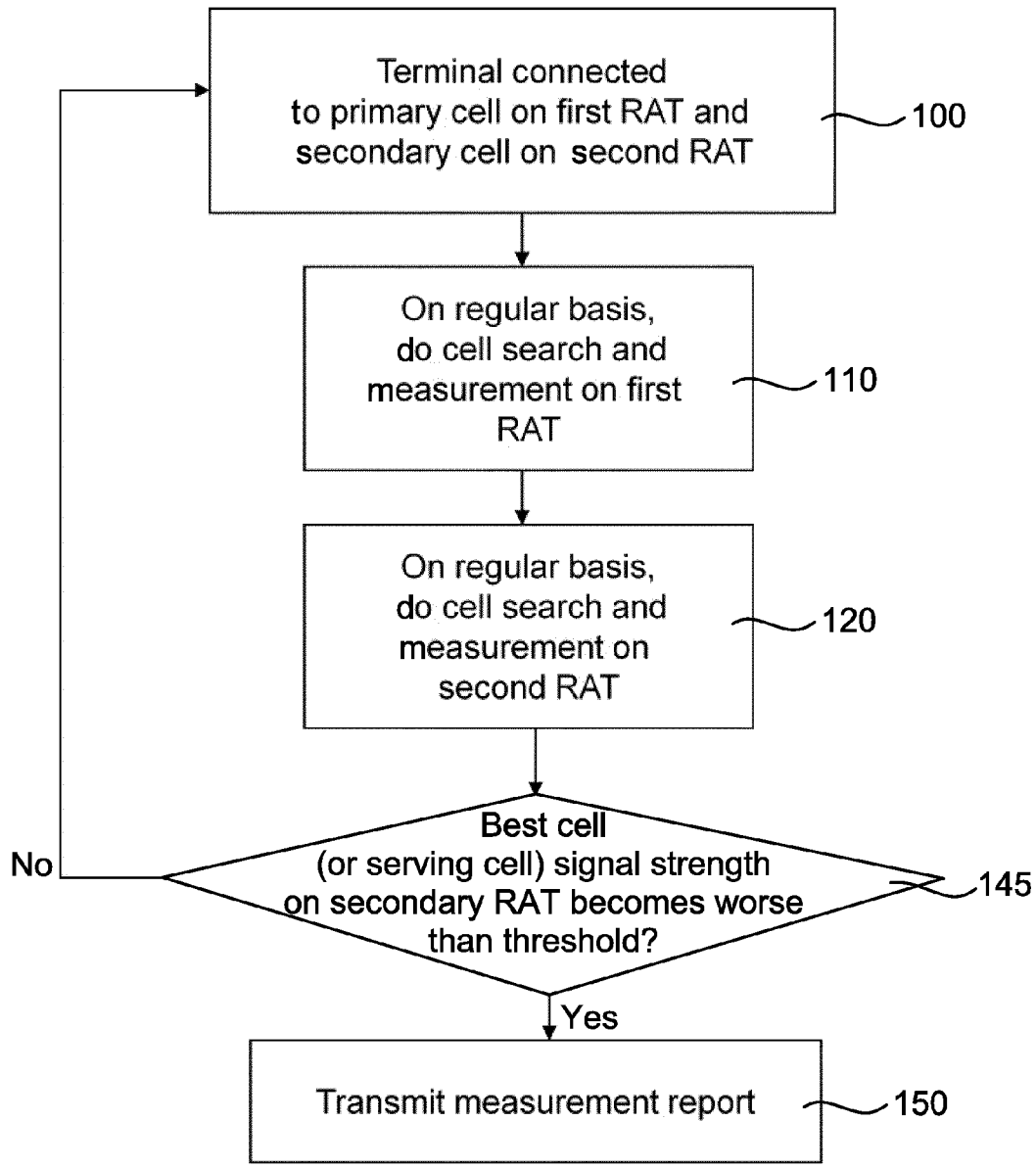
FIG. 3 is another flow chart of methods implemented in a user equipment.

FIG. 3 shows yet another embodiment of the invention. Steps 100, 110 and 120 as described for the previous embodiments are performed also in this embodiment. In this case the UE monitors whether the signal strength of the best (i.e. strongest) cell on the secondary RAT becomes worse/lower than a threshold (145). In this case "best" includes both detected neighboring cells as well as serving cell(s). Once the measurement event is triggered, i.e. the criterion is fulfilled, a measurement report is transmitted to the network node (150). The report may include information telling that it was this particular event that triggered the report, in case the UE is configured with multiple events. Such measurement event could be helpful for the network to deactivate the secondary RAT. In an alternative embodiment, only the serving cell is used for triggering such measurement event.

Figure 4:
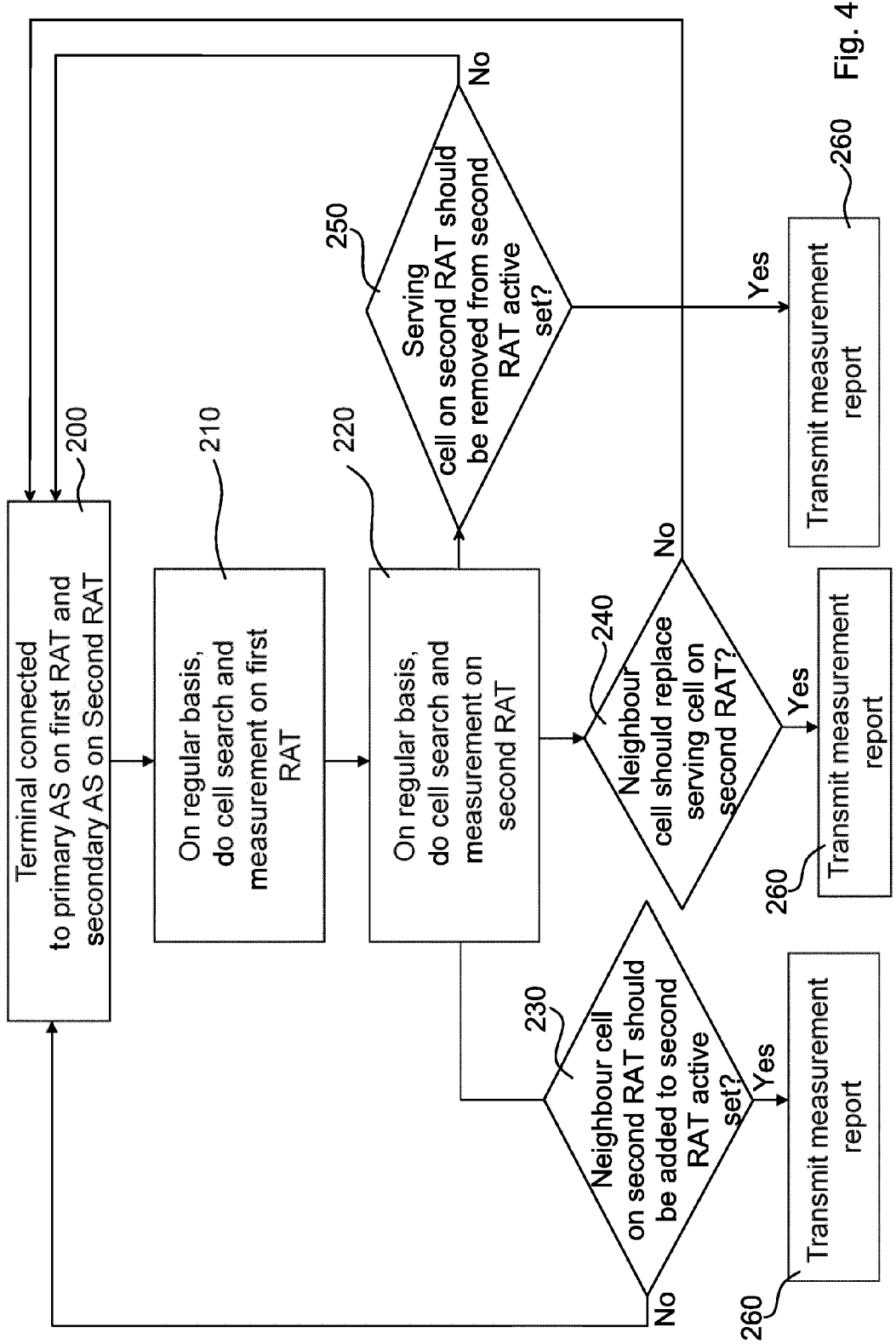
FIG. 4 is yet another flow chart of methods implemented in a user equipment.

FIG. 4 shows another flow chart of a terminal/UE embodiment of the invention. In this case the second RAT support soft Handover (for instance, the second RAT is WCDMA/HSPA). The steps 200-220 are corresponding to steps 100, 110, 120, respectively, in FIG. 2, while steps 230, 240, 250 show the new measurement events that are monitored in this embodiment, all related to updating the active set on the second RAT: Add cell (230), Replace cell (240), and Remove cell (250). More specifically, the measurement event Add cell 230 comprises determining whether a neighboring cell, also denoted neighbor cell, on second RAT should be added to the active set of the second RAT; the measurement event Replace cell 240 comprises determining whether a neighboring cell should replace the serving cell on the second RAT; and the measurement event Remove cell 250 comprises determining whether the serving cell on the second RAT should be removed from the active set of the second RAT.

In the following a few particular examples of the above are given. A cell may be added to an active set if a neighboring cell becomes offset 1 dB from the strongest cell in the active set. A weakest cell included in the active set may be replaced if it becomes offset 2 dB below the best cell (e.g. the cell having the strongest signal). A neighbor cell may become offset 3 dB stronger than a cell in the active set, upon which the neighbor cell replaces that cell in the active set.

The common denominator of all these events is that they are Inter-RAT events related to neighbor cells and serving cells of the secondary RAT. For example, a "replace cell" event could be defined as a trigger resulting in a report if there is a change in the best cell among the cells in the active set. Once the measurement event is triggered, i.e. the criterion is fulfilled in 230, 240 or 250, a measurement report is transmitted to the network node (260). The report may include information telling that it was this particular event that triggered the report, in case the UE is configured with multiple events.

With reference to the embodiments above, in an aspect of the invention a method performed in a user equipment of a communication network for reporting inter-radio access technologies measurements is provided. The communication network comprises a primary radio access technology system and a secondary radio access technology system, and the user equipment is connected to at least one cell of the primary radio access technology system and at least one cell of the secondary radio access technology system. The method comprises:

performing 110, 210 signal strength measurements in the primary radio access technology system, performing 120, 220 signal strength measurements in the secondary radio access technology system, evaluating 130, 140, 145, 230, 240, 250 based on the signal strength measurements in the primary radio access technology system and the secondary radio access technology system, fulfillment of criterion for a measurement event for at least the secondary radio access technology system, and transmitting 150, 260, to a control node in the communication network, measurement reports, in particular signal strength measurement reports, fulfilling the criterion for the measurement event.

Figure 5:
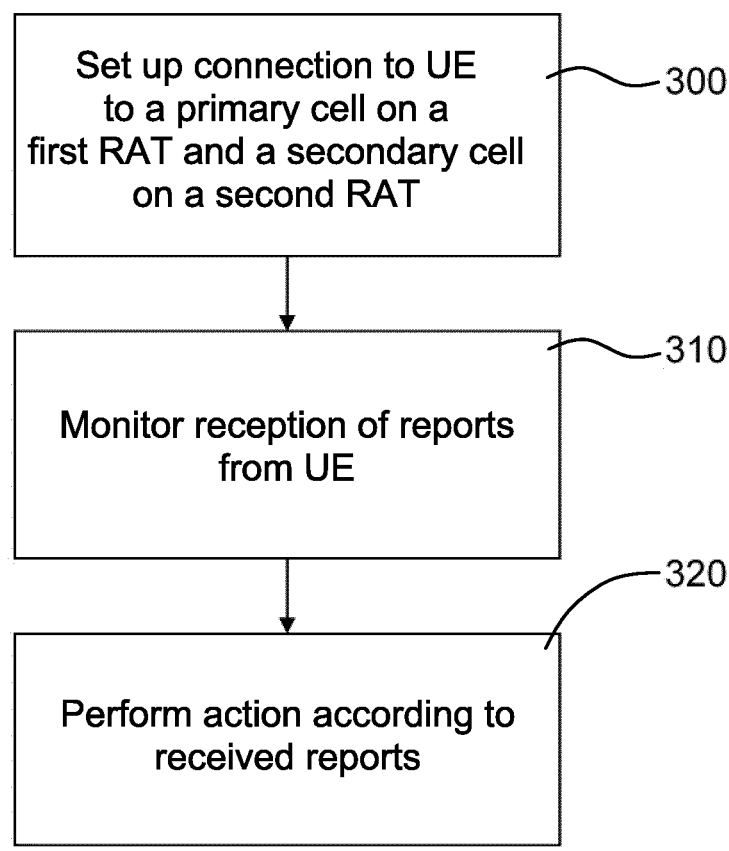
FIG. 5 is a flow chart of methods implemented in a network node.

FIG. 5 shows a flow chart over network node actions according to further embodiments of the invention. The network node sets up an LTE+HSPA carrier aggregation connection to a mobile terminal/UE, giving information of first RAT and primary serving cell on first RAT, and of second RAT and secondary serving cell on the second RAT (300). It should be noted that parts of step 300 may be performed at different time-instances, such that the connection may first be established in a first RAT, and then at a later instance, a secondary cell is added on a second RAT.

The network node then configures the UE with measurement events according to embodiments of the present invention (not shown). In the following some examples are given on how, i.e. with which measurement events and corresponding criterion, the network node may configure the UE 4.

In an embodiment, the network node may configure the user equipment 4 with a criterion and measurement event for determining whether a neighbor cell on the second radio access technology system becomes a configurable parameter stronger than the secondary serving cell on the second radio access technology system.

In an embodiment, the network node may configure the user equipment 4 to determine whether a criterion for the measurement event related to the first radio access technology system is fulfilled.

In a variation of the above embodiment (wherein the user equipment 4 is configured to determine whether a criterion for the measurement event related to the first radio access technology system is fulfilled), the network node may configure the user equipment 4 with a criterion and measurement event for determining whether the signal strength of the secondary serving cell on the second radio access technology system is above a first threshold and the signal strength of the primary serving cell on the first radio access technology system is below a second threshold.

In another variation, the network node may configure the user equipment 4 with a criterion and measurement event for determining if the secondary serving cell on the second radio access technology system is a configurable parameter stronger than the primary serving cell in the first radio access technology system.

In an embodiment, the network node may configure the user equipment 4 with a criterion and measurement event for determining whether the signal strength of the strongest cell on the second radio access technology system becomes worse than a threshold.

In an embodiment, the network node may configure the user equipment 4 with a criterion and measurement event for determining whether a neighbor cell on the second radio access technology system should be added to active set of the second radio access technology system, and/or for determining whether a neighboring cell should replace the secondary serving cell on the second radio access technology system, and/or for determining whether secondary serving cell on second radio access technology system should be removed from an active set of the second radio access technology system.

The network node may thus monitor the measurement event as described in FIG. 2 and/or 4 (310). Once a measurement event is triggered and report is received and detected by the network node, corresponding action is made (320). For example, if the measurement report indicates the need to perform a change of secondary (serving) cell in the second RAT, then the network node may take actions to prepare such a cell change in the second RAT. After successful preparation in the network, the network node then sends a reconfiguration message to the UE, and the UE performs required actions to fulfill the command. For example, the network may tell the UE to change the secondary serving cell in the second RAT. Upon completion of the action, the UE may send a message to the network indicating that the action has been successfully completed.

The preparation mentioned above may include e.g. hardware and other resource reservation in the node controlling the second RAT. If the network node in control of the connection is different from the node controlling the second RAT, it may happen that there is a need to request resources using signaling between the network node and the node controlling the second RAT.

Figure 6:
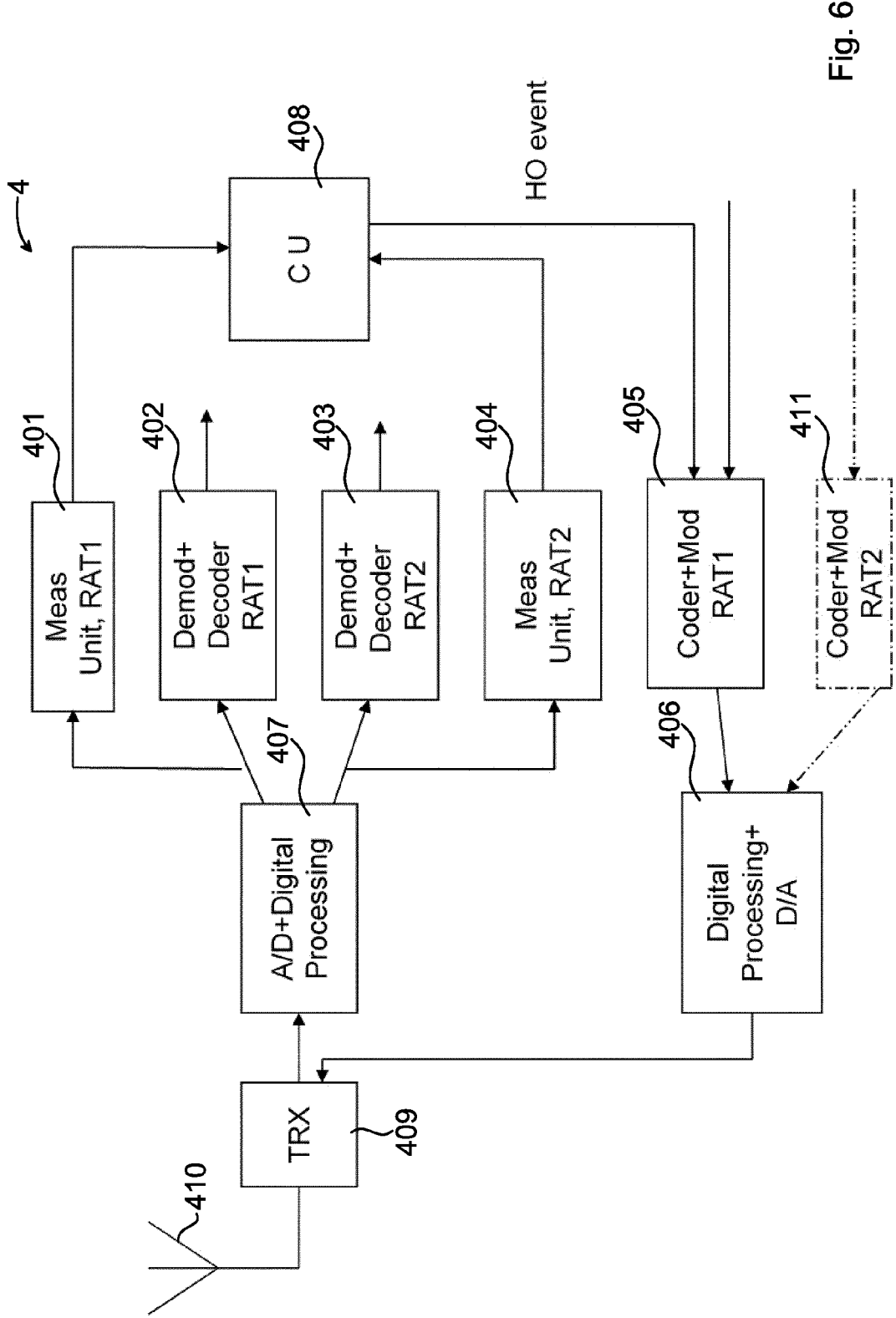
FIG. 6 illustrates a user equipment comprising functional blocks or means for implementing the methods.

FIG. 6 shows a block diagram over the mobile terminal/UE 4 operating according to the embodiments of the invention. The UE 4 includes an antenna 410 (or several antennas), and radio unit 409 (TRX) transforming the radio signal to an analog baseband signal (RX) and vice versa (TX). The UE 4 furthermore also comprises, on the receiver side, digital processing units 407 including Analog-to-Digital (AD) and as well as digital filter functions, aiming for filtering out signals corresponding to the first and second RAT. For respective RAT a demodulator and decoder 402, 403 are present, as known in the art. Furthermore, measurement circuits/units 401, 404, used for determination of signal strength of serving as well as neighboring cells on respective first and second RAT are included in the UE 4. A control unit 408 then receives the signal measurements from the first and second RAT and triggers potential measurement event as described earlier. Once triggered, the information is included in data messages that are fed to a coder and modulator unit 405, 411 for respective RAT, well known in the art. The signal is then digital processed and the respective RAT signals are then summed (transmitted on a different carrier frequency) and fed to the transmitter unit 409 transmitting the signal to the network node. It is noted that in some embodiments, the inter-RAT aggregation is only made in the downlink (DL), hence only a single RAT (the first RAT) is then used in the UL (that is, no coder and modulator unit 411 for the second RAT is needed).

It is further noted that some units illustrated in FIG. 6 may be implemented on a common circuit or unit. For example, the coder and modulator functionality of the two RATS may be implemented within the same unit.

Example Implementations

Figure 7:
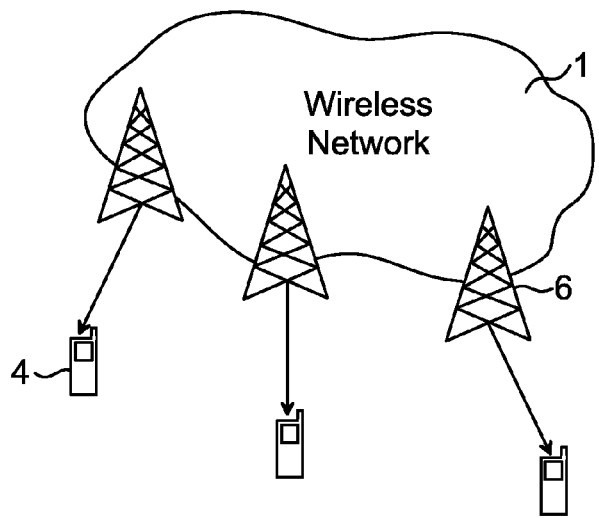
FIG. 7 illustrates schematically an environment, and in particular a communication system, in which embodiments of the invention may be implemented.

Although the described solutions may be implemented in any appropriate type of telecommunication system supporting any suitable communication standards and using any suitable components, particular embodiments of the described solutions may be implemented in a network or communication system 1 (e.g., HSPA or LTE), such as that illustrated in FIG. 7.

As shown in FIG. 7, the example network may include one or more instances of user equipment (UEs) 4 and one or more base stations 6 capable of communicating with these UEs 4, along with any additional elements suitable to support communication between UEs 4 or between a UE 4 and another communication device (such as a landline telephone). Although the illustrated UEs 4 may represent communication devices that include any suitable combination of hardware and/or software, these UEs 4 may, in particular embodiments, represent devices such as the example UE 4 illustrated in greater detail by FIG. 8 (and/or FIG. 6). Similarly, although the illustrated base stations 6 may represent network nodes that include any suitable combination of hardware and/or software, these base stations 6 may, in particular embodiments, represent devices such as the example base station illustrated in greater detail by FIG. 9.

Figure 8:
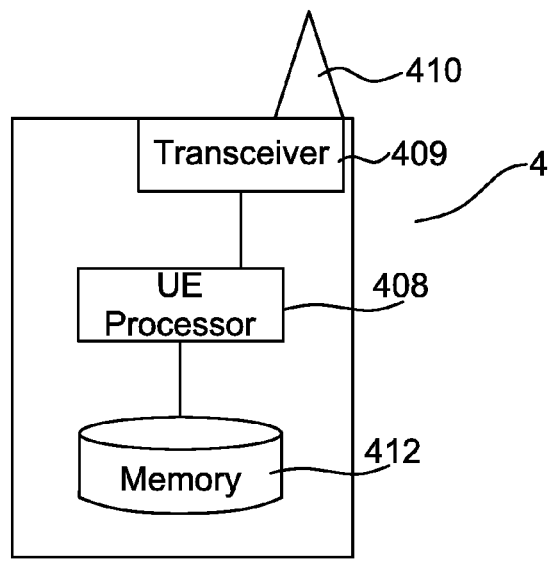
FIG. 8 illustrates schematically a user equipment suitable for implementing embodiments of the methods.

As shown in FIG. 8, the example UE 4 includes a processor or processor circuit 408, a memory 412, a transceiver 409, and an antenna 410. In particular embodiments, some or all of the functionality described above as being provided by mobile communication devices or other forms of UE may be provided by the UE processor circuit 408 executing instructions stored on a computer-readable medium, such as the memory 412 shown in FIG. 8. Alternative embodiments of the UE 4 may include additional components beyond those shown in FIG. 8 that may be responsible for providing certain aspects of the UE's functionality, including any of the functionality described above and/or any functionality necessary to support the solution described above.

Figure 9:
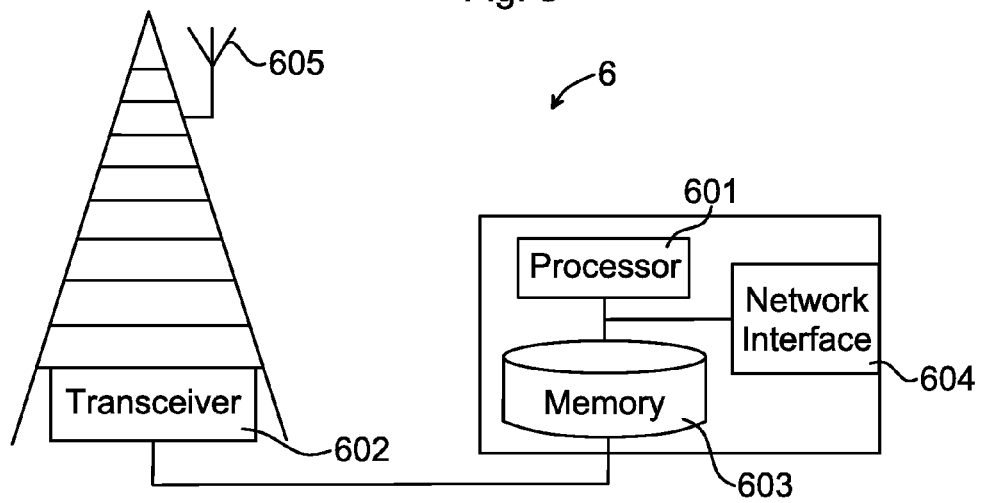
FIG. 9 illustrates an exemplifying base station comprising means for implementing embodiments of the methods.

As shown in FIG. 9, the example base station 6 includes a processor or processor circuit 601, a memory 603, a transceiver 602, and an antenna 605. In particular embodiments, some or all of the functionality described above as being provided by a mobile base station, a base station controller, a node B, an enhanced node B, and/or any other type of mobile communications node may be provided by the base station processor circuit 601 executing instructions stored on a computer-readable medium, such as the memory 603 shown in FIG. 9. Alternative embodiments of the base station 6 may include additional components responsible for providing additional functionality, including any of the functionality identified above and/or any functionality necessary to support the solution described above.

It is again noted that the present invention is not limited to the exemplary technologies mentioned in the description, but the invention is equally applicable to any combination of radio access technologies (RATs). For example, the RATs may comprise LTE and WLAN or HSPA and WLAN or any other radio access technologies.

The invention claimed is:

1. A method, implemented in a user equipment of a communication network, for reporting inter-radio access technologies measurements, the communication network comprising a first radio access technology system and a second radio access technology system, the user equipment being simultaneously connected to and served by a primary serving cell of the first radio access technology system via a primary carrier and a secondary serving cell of the second radio access technology system via a secondary carrier, the method comprising:
performing signal strength measurements on the primary carrier of the first radio access technology system;
performing signal strength measurements on the secondary carrier of the second radio access technology system;
wherein the first radio access technology system controls both the connection between the user equipment and the primary serving cell of the first radio access technology system and the connection between the user equipment and the secondary serving cell of the second radio access technology system;
determining, based on the corresponding signal strength measurements, whether a criterion for a measurement event is fulfilled, the criterion relating to a serving cell change of the second radio access technology system or relating to a change of a primary radio access technology system;
in response to the criterion being fulfilled, transmitting a corresponding measurement report to the communication network by transmitting a measurement related to the second radio access technology system to the first radio access technology system.

2. The method of claim 1, wherein the determining whether a criterion for a measurement event relating to the second radio access technology system is fulfilled comprises determining whether a neighbor cell on the second radio access technology system becomes stronger, by a configurable amount, than the secondary serving cell on the second radio access technology system.

3. The method of claim 2:
wherein the performing of signal strength measurements in the second radio access technology system comprises:
measuring a neighbor-cell signal strength measurement on the secondary carrier in the second radio access technology system;
measuring a serving-cell signal strength measurement on the secondary carrier in the second radio access technology system;
wherein the determining comprises comparing the neighbor-cell signal strength measurement with the secondary serving-cell signal strength measurement.

4. The method of claim 1, further comprising determining whether a criterion for a measurement event related to the first radio access technology system is fulfilled.

5. The method of claim 4, further comprising determining whether signal strength of the secondary serving cell on the second radio access technology system is above a first threshold and the signal strength of the primary serving cell on the first radio access technology system is below a second threshold.

6. The method of claim 4, further comprising determining if the secondary serving cell on the second radio access technology system is stronger, by a configurable amount, than the primary serving cell in the first radio access technology system.

7. The method of claim 1, wherein the determining comprises determining whether a signal strength of a strongest cell on the second radio access technology system becomes lower than a threshold.

8. The method of claim 1 the determining comprises at least one of:
- determining whether a neighbor cell on the second radio access technology system should be added to active set of the second radio access technology system;
- determining whether a neighboring cell should replace the secondary serving cell on the second radio access technology system;
- determining whether the secondary serving cell on the second radio access technology system should be removed from an active set of the second radio access technology system.

9. A user equipment of a communication network, the communication network comprising a first radio access technology system and a second radio access technology system, the user equipment being configured to be simultaneously connected to and served by a primary serving cell of the first radio access technology system via a primary carrier and a secondary serving cell of the second radio access technology system, via a secondary carrier, the user equipment comprising:
- a processor circuit configured to:
  - perform signal strength measurements on the primary carrier of the first radio access technology system;
  - perform signal strength measurements on the secondary carrier of the second radio access technology system, wherein the first radio access technology system controls both the connection between the user equipment and the primary serving cell of the first radio access technology system and the connection between the user equipment and the secondary serving cell of the second radio access technology system
  - determine, based on the signal strength measurements, whether a criterion for a measurement event is fulfilled, the criterion relating to a serving cell change on the second radio access technology system;
  - in response to the criterion being fulfilled, transmit a corresponding measurement report to the first radio access technology system, the measurement report comprising a measurement related to the secondary radio access technology system.

10. The user equipment of claim 9, wherein the processor circuit is configured to determine whether a neighbor cell on the second radio access technology system becomes stronger, by a configurable amount, than the secondary serving cell on the second radio access technology system.

11. The user equipment of claim 10:
- wherein the processor circuit is configured to perform signal strength measurements in the second radio access technology system by:
  - measuring a neighbor-cell signal strength on the secondary carrier in the second radio access technology system;
  - measuring a serving-cell signal strength on the secondary carrier in the second radio access technology system;
- wherein the processor circuit is configured to determine whether the criterion is fulfilled by comparing the neighbor-cell signal strength with the secondary serving-cell signal strength.

12. The user equipment of claim 9, wherein the processor circuit is further configured to determine whether a criterion for a measurement event related to the first radio access technology system is fulfilled.

13. The user equipment of claim 12, wherein the processor circuit is configured to determine whether a signal strength of the secondary serving cell on the second radio access technology system is above a first threshold and a signal strength of the primary serving cell on the first radio access technology system is below a second threshold.

14. The user equipment of claim 12, wherein the processor circuit is configured to determine if the secondary serving cell on the second radio access technology system is stronger, by a configurable amount, than the primary serving cell in the first radio access technology system.

15. The user equipment of claim 9, wherein the processor circuit is configured to determine whether a signal strength of a strongest cell on the second radio access technology system becomes lower than a threshold.

16. The user equipment of claim 9, wherein the processor circuit is configured to determine at least one of:
- whether a neighbor cell on the second radio access technology system should be added to active set of the second radio access technology system;
- whether a neighboring cell should replace the secondary serving cell on the second radio access technology system;
- whether a secondary serving cell on second radio access technology system should be removed from an active set of the second radio access technology system.

17. The user equipment of claim 9, wherein the measurement event relates to a serving cell change.

18. A method implemented in a network node of a communication network, the communication network comprising a first radio access technology system and a second radio access technology system, the communication network further comprising a user equipment, the method comprising:
- setting up a connection between the user equipment and both a primary serving cell of the first radio access technology system and a secondary serving cell of the second radio access technology system, using primary and secondary carriers respectively associated with the primary and secondary serving cells, so that the user equipment is in connection with and being served simultaneously by both the first radio access technology system on the primary carrier and the second radio access technology system on the secondary carrier such that the first radio access technology system controls both of the connections;
- configuring the user equipment with one or more measurement events relating to the second radio access technology system;
- monitoring and receiving a measurement report from the user equipment corresponding to a criterion for the measurement event being fulfilled, wherein the measurement event either relates to a serving cell change of the second radio access technology system or relates to a change of primary radio access technology system;
- wherein the measurement report is related to the second radio access technology system and received via the first radio access technology system;

performing an action in accordance with the received measurement report.

19. The method of claim 18, wherein the configuring comprises configuring the user equipment with a criterion and measurement event for determining whether a neighbor cell on the second radio access technology system becomes stronger, by a configurable amount, than the secondary serving cell on the second radio access technology system.

20. The method of claim 18, wherein the configuring comprises configuring the user equipment to determine whether a criterion for a measurement event related to the first radio access technology system is fulfilled.

21. The method of claim 20, wherein the configuring comprises configuring the user equipment with a criterion and measurement event for determining whether a signal strength of the secondary serving cell on the second radio access technology system is above a first threshold and a signal strength of the primary serving cell on the first radio access technology system is below a second threshold.

22. The method of claim 20, wherein the configuring comprises configuring the user equipment with a criterion and measurement event for determining if the secondary serving cell on the second radio access technology system is stronger, by a configurable amount, than the primary serving cell in the first radio access technology system.

23. The method of claim 18, wherein the configuring comprises configuring the user equipment with a criterion and measurement event for determining whether a signal strength of a strongest cell on the second radio access technology system becomes worse than a threshold.

24. The method of claim 18, wherein the configuring comprises configuring the user equipment with a criterion and measurement event for determining at least one of:
- whether a neighbor cell on the second radio access technology system should be added to active set of the second radio access technology system;
- whether a neighboring cell should replace the secondary serving cell on the second radio access technology system;
- whether the secondary serving cell on second radio access technology system should be removed from an active set of the second radio access technology system.

25. A network node of a communication network, the communication network comprising a first radio access technology system and a second radio access technology system, the communication network further comprising a user equipment connected to a primary serving cell of the first radio access technology system and a secondary serving cell of the second radio access technology system, the network node comprising:
- a processor circuit configured to:
  - set up a connection between the user equipment and both a primary serving cell of the first radio access technology system and a secondary serving cell of the second radio access technology system, using primary and secondary carriers respectively associated with the primary and secondary serving cells, so that the user equipment is simultaneously in connection with and served by the first radio access technology system on the primary carrier and the second radio access technology system on the secondary carrier such that the first radio access technology system controls both of the connections;
  - configure the user equipment with one or more measurement events relating to the second radio access technology system;
  - monitor and receive a measurement report from the user equipment via the first radio access technology system, the measurement report corresponding to a criterion for the measurement event being fulfilled, the criterion either relating to a serving cell change of the second radio access technology system or relating to a change of primary radio access technology system;
  - perform an action in accordance with the received measurement report.

26. The network node of claim 25, wherein the processor circuit is configured to configure the user equipment to determine whether a criterion for a measurement event related to the first radio access technology system is fulfilled.

27. The network node of claim 26, wherein the processor circuit is configured to configure the user equipment with a criterion and measurement event for determining whether a signal strength of the secondary serving cell on the second radio access technology system is above a first threshold and a signal strength of the primary serving cell on the first radio access technology system is below a second threshold.

28. The network node of claim 26, wherein the processor circuit is configured to configure the user equipment with a criterion and measurement event for determining if the secondary serving cell on the second radio access technology system is stronger, by a configurable amount, than the primary serving cell in the first radio access technology system.

29. The network node of claim 25, wherein the processor circuit is configured to configure the user equipment with a criterion and measurement event for determining whether a signal strength of a strongest cell on the second radio access technology system becomes worse than a threshold.

30. The network node of claim 25, wherein the processor circuit is configured to configure the user equipment with a criterion and measurement event for determining at least one of:
- whether a neighbor cell on the second radio access technology system should be added to active set of the second radio access technology system;
- whether a neighboring cell should replace the secondary serving cell on the second radio access technology system;
- whether the secondary serving cell on second radio access technology system should be removed from an active set of the second radio access technology system.

* * * * *